Nov. 15, 1938.  C. M. FIELDS ET AL  2,136,424
PROCESS OF POLYMERIZATION
Filed June 2, 1937
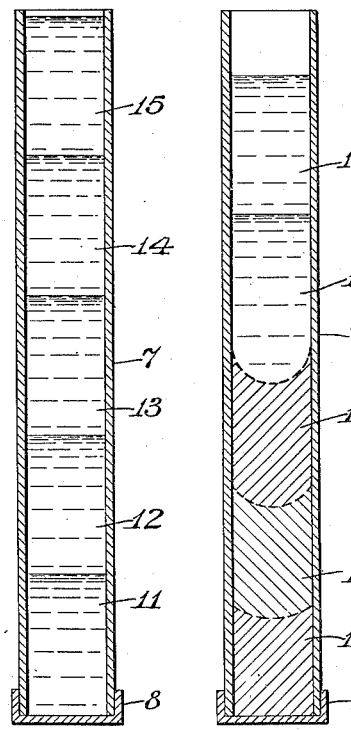
Fig. 1  Fig. 2
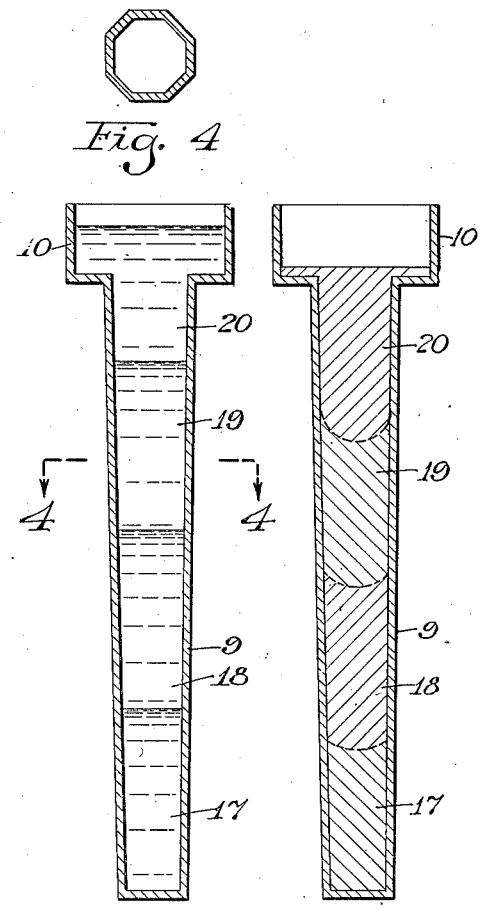
Fig. 4
Fig. 3  Fig. 5
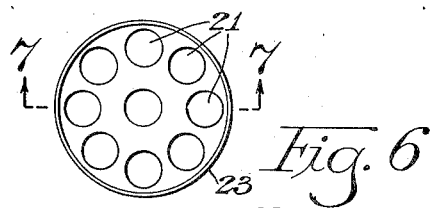
Fig. 6
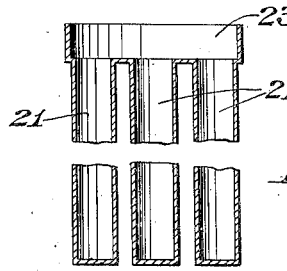
Fig. 7
Charles M. Fields
Reuben T. Fields  INVENTORS
BY
J. M. Castle Jr.
ATTORNEY.

Patented Nov. 15, 1938

2,136,424

UNITED STATES PATENT OFFICE 2,136,424

PROCESS OF POLYMERIZATION

Charles M. Fields and Reuben T. Fields, Arlington, N. J., assignors to E. I. du Pont de Nemours & Company, Wilmington, Del., a corporation of Delaware Application June 2, 1937, Serial No. 145,935

9 Claims. (Cl. 18—58)

This invention relates to a process of polymerization and, more particularly, to a process of polymerizing organic compounds in elongated shapes such as rods, tubes, sheets, and the like.

The polymerization of certain organic liquid compounds into rods, tubes, sheets, and other primary shapes from which articles may be fabricated by machining processes, as well as the polymerization of such compounds in finished shapes, is known. This invention relates to improvements in such processes where applied to organic compounds that are polymerizable to at least fairly hard solid shapes suitable for use as "turnery resins" and which, in the course of the polymerization reaction, release considerable heat and undergo appreciable shrinkage; the term "polymerizable organic compounds" as used throughout the specification is intended to mean a compound of this character.

Polymerizable organic compounds are readily polymerized upon the application of heat, either in the presence or absence of a catalyst for the polymerization reaction, to a relatively hard solid body but, because the reaction of polymerization involves appreciable shrinkage, (i. e., the solid polymer is denser than the liquid monomer), the polymerization of the monomeric compounds in molds, a species of casting and not of heat and pressure molding, to give a flawless product of the full cross section of the mold, has involved great difficulty.

An object of the present invention is to provide a simple and economical process of producing flawless objects of polymerized organic compounds in elongated shapes. A further object is to provide a process wherein molds of light, simple construction may be used. Other objects of the invention will be apparent from the description given hereinafter.

The above objects are accomplished according to the present invention by introducing into a substantially vertically positioned elongated mold closed at the lower end a plurality of successive portions of a liquid composition comprising a monomeric polymerizable organic compound, having successively lower viscosities, the difference in viscosity between successive portions being sufficient to prevent any substantial commingling thereof, and subjecting said composition to heat and simultaneously to pressure.

The invention is based upon recognition of the fact that organic compounds of the type under consideration may be polymerized without the development of flaws due to local areas of excessive temperature or to shrinkage, provided that the polymerization at any time is confined to a narrow zone or layer. The present invention depends further upon providing, adjacent to the zone in which the polymerization is proceeding, a mass of incompletely polymerized material in a flowable condition so that it is capable of moving toward and into the zone of polymerization to compensate for the shrinkage accompanying the polymerization going on in the zone.

The invention will be described more specifically with reference to the accompanying drawing wherein:

Fig. 1 is a diagrammatic vertical section along the axis of a cylindrical mold adapted for carrying out the present invention, and showing the contents of the mold at the beginning of the process;

Fig. 2 is a view similar to Fig. 1 but illustrating the condition of the contents of the mold at an intermediate stage of the process;

Fig. 3 is a diagrammatic vertical section along the axis of a mold of another form suitable for carrying out the present invention, and showing the contents of the mold at the beginning of the process;

Fig. 4 is a section on the line 4—4 of Fig. 3;

Fig. 5 is a view similar to Fig. 3 but illustrating the contents of the mold at the conclusion of the process; and Figs. 6 and 7 are, respectively, a plan view and a vertical section of a multiple mold suitable for use in the process of the present invention.

In the following example, illustrating a specific embodiment of the invention, reference is made to Figs. 1 and 2 of the drawing:

*Example 1.*—Five lots of partially polymerized methyl methacrylate syrup are prepared by heating monomeric methyl methacrylate for different lengths of time. In each lot some polymerization takes place with a consequent increase in viscosity above that of the straight monomer. The five lots range in viscosity from the most viscous which can just be poured at room temperature into a narrow mold and contains about 12% of polymer, to the least viscous which is a fluent syrup containing about 1% of polymer. All five lots contain 0.02% of benzoyl peroxide as a polymerization catalyst.

Referring to Fig. 1, a cylindrical aluminum mold 7, 10" in height and having the end piece 8, is held in vertical position while being loaded with the syrups described above. A portion of the syrup of highest viscosity is first poured into the mold and, after this has settled to a flat free surface and any trapped air has been released, a portion of approximately the same volume of the syrup of the next lower viscosity is poured into the mold. These portions are designated by the numerals 11 and 12, respectively, and, because of their difference in viscosity, there is substantially no commingling of the two in the mold and their interfaces may properly be indicated roughly by the straight lines separating the portions 11 and 12 as shown in Fig. 1. Similarly, portions 13, 14, and 15 are poured into the mold, these successive portions have successively lower viscosities.

The mold, thus loaded, is placed in an autoclave in vertical position and is subjected to a temperature of 65° C. uniformly along its height and simultaneously to a pressure of 165 pounds per square inch.

Polymerization is completed most rapidly in the portion 11 of highest initial viscosity and the shrinkage taking place in this portion due to the polymerization, is compensated by the continuous downward flow of the more liquid syrups from above. The polymerization proceeds through the layer 11 and then successively through the layers 12, and 13, and so on with the shrinkage at all times being compensated by the downward movement of the still flowable material above.

Fig. 2 shows the condition of the contents of the mold at an intermediate stage in the process. Portions 11, 12, and 13 have polymerized to substantially their ultimate hard condition, as indicated conventionally in Fig. 2, and the free surface of the liquid at the top of the mold, i. e., at the top of the layer 15, has become lowered by the amount of the shrinkage which has taken place in the polymerization thus far accomplished. The original dividing planes between the layers which have polymerized, are shown in Fig. 2 by dotted lines indicating a parabolic configuration although no such division is actually visible in the polymerized material which is entirely homogeneous in appearance. The altered shape of the interfaces between the portions is explained by the slight inequality of the rate of progress of polymerization vertically as between the periphery and center of the material. The thermal conductivity of the metal of the mold tends to carry upwards the heat developed during polymerization, which is exothermic in nature, and, accordingly, the progress of polymerization is at all times soon after the start slightly further advanced around the periphery of the mass.

At the end of 18 hours, polymerization has proceeded throughout the mass and there has been formed in the mold a cylindrical rod of polymerized methyl methacrylate having the full cross sectional area of the interior of the mold and having a length about 80% of the depth of the syrup originally loaded into the mold.

The mold and contents are removed from the autoclave and cooled to room temperature. The cap 8 is then removed and the rod of polymerized methyl methacrylate is taken from the tubular portion 7 of the mold.

In the following example a slightly different embodiment of the invention is given, reference being made to Figs. 3, 4, and 5:

*Example 2.*—In this example the mold shown is made in conventional manner by immersing a steel master mold into a molten alloy of 97% lead and 3% tin and withdrawing the master mold from the molten alloy. Sufficient of the latter freezes on the master mold and is stripped therefrom to form the mold used. As illustrated in Figs. 3 and 4, the mold is tapered and of hexagonal cross section; such a mold is suitable for the production of tapered hexagonal handles for toilet ware, and the like.

The mold consists of a main tubular portion 9, closed at the bottom, and a widened portion 10 at the top to provide space for liquid which will ultimately flow down into the portion 9 of the mold as shrinkage takes place.

Four successive portions of methyl methacrylate syrup, each containing 0.04% of benzoyl peroxide, are loaded into the mold as in Example 1. The first portion 17 is of about the highest viscosity that can satisfactorily be poured into an elongated mold of restricted diameter. The next portion 18 is of a lower viscosity and is obtained by mixing the high viscosity syrup of portion 17 with an equal volume of monomer. The third portion 19 is of still lower viscosity and is obtained by diluting the syrup of portion 18 with an equal volume of monomer. The layer 20 is substantially straight monomer. As shown in Fig. 3, the four portions 17, 18, 19, and 20 are of approximately equal volume and calculated to fill the main portion 9 of the mold with a very slight excess, when polymerization has been completed. For this reason, the portion 20, as originally poured into the mold, extends up into the widened top 10 of the mold.

The loaded mold is then placed in vertical position in an autoclave where it is subjected to a temperature of 65° C. and a pressure, provided by nitrogen gas, of 175 pounds per square inch.

Polymerization takes place as explained in Example 1 with the material in flowable condition moving continuously downwardly to compensate for shrinkage which accompanies the polymerization. At the end of 18 hours the mold and contents have the appearance indicated diagrammatically in Fig. 5 except that the dotted lines showing the altered interfaces of the portions will not be visible. This mass of polymerized methyl methacrylate is removed from the autoclave and, after cooling to room temperature, is tapped out of the mold.

Figs. 6 and 7 illustrate more or less diagrammatically a multiple mold somewhat similar to that shown in Figs. 3, 4, and 5. In this type of mold there are a plurality of mold cavities 21 and a common reservoir at the top designated by reference numeral 23. In the use of this type of mold, the material in the reservoir 23 flows down and compensates for shrinkage in each of the mold cavities 21 as polymerization progresses. As a practical matter, the mold cavities 21 must be far enough apart to permit access of heat uniformly to each mold.

The above examples are merely illustrative and the procedural details may be varied widely without departing from the scope of the present invention.

The number of portions of polymerizable compound of different viscosities may range from two upwards but the difference in viscosity of successive portions must be sufficient to prevent any appreciable commingling of the portions. The topmost portion may be straight monomer or may be a syrup of substantial viscosity; the other portions, of course, must be syrups of some viscosity to obtain the necessary viscosity gradient. The use of quite high viscosity syrups in the lower portions going into the mold is desirable as their use tends to prevent development of convection currents which would carry heated material undergoing active polymerization up into the upper layers and thus make it difficult to limit polymerization at any given time to a comparatively shallow layer.

Practically, there is a limit to the vertical height of the individual portions that may be used. The present process depends upon a gradient in the viscosity of the material as originally loaded into the mold, i. e., a gradient in the extent to which polymerization has proceeded in each portion. This gradient, from bottom to top of the mold, must be a substantial one so that active polymerization may at all times be limited to a shallow layer while the material above remains capable of flowing downward to compensate for shrinkage. Each individual portion of syrup in the mold constitutes, in effect, a mass of material having no such vertical gradient and, if its vertical height is too great, there will be a tendency for polymerization to be active in too thick a layer at one time, voids and flaws in the finished product resulting therefrom. It has been found that it is advisable to limit the vertical height of the individual portions in the mold to not more than about 2″. Thus, in a mold 10″ high, which is about the tallest with which the present process is practicable without taking special measures, there should be not fewer than five portions of different viscosities.

The limitation on the height of the individual portions and, hence, the limitation on the total height of the mold, is determined, however, in part by the magnitude of the pressure maintained upon the mass. With higher pressures the height of the portions may be increased somewhat; with lower pressure, it must be reduced.

Those skilled in the art will understand that a proper balance must be maintained between the viscosity and the catalytic content of the polymerizable material, the temperature to which it is exposed in the course of the process and the pressure to which it is subjected. The effect of increasing the temperature and of increasing the catalytic influence are both in the direction of speeding up the polymerization. The rate of polymerization governs the tendency of the mass to develop bubbles. Since this formation of bubbles can be prevented by the application of suitable pressure, it will be evident that the greater the content of catalyst present, the lower the temperature should be at a given pressure and that, in so far as the rate of polymerization is increased through the influence of either catalyst or temperature, or both, the pressure which must be applied to prevent the formation of bubbles, must also be increased.

Pressures upon the polymerizable material between about 150 and 200 pounds per square inch will ordinarily be found preferable. Pressures as low as 50 pounds per square inch may be used but are less desirable as the heights of the individual portions must be correspondingly reduced. Although pressures in excess of 200 pounds per square inch permit an increase in the height of the individual portions, they are likely to be less desirable practically because of the requirement that the pressure vessel be correspondingly stronger.

The present invention may be used advantageously in combination with that set forth in our copending application Serial No. 145,934, entitled "Polymerization process," filed of even date herewith. According to this latter invention, the limitation of active polymerization to a shallow layer, the downward movement of material to compensate for shrinkage, and the progress of active polymerization from the bottom to the top of the mass are brought about by subjecting the contents of the mold to temperatures gradually decreasing from the bottom upwards while simultaneously applying pressure thereto. This is effected by applying heat to the bottom only of a metal mold loaded as already described in the present specification. By the use of this combined procedure, instead of applying heat uniformly through the height of the mold the limitation of the height of the individual portions loaded into the mold in accordance with the present invention may be relaxed. This combined procedure may be applied feasibly to molds of a height in excess of 15″.

The temperature to which the polymerizable organic compound is to be heated in the course of polymerization must be selected in view of the particular compound in question and the conditions of pressure and of cross sectional dimensions of the mold being used. Normally the temperature will be permitted to rise high enough for polymerization to proceed at an economical speed but not so high as to involve the risk of overheating. The manner of establishing an optimum temperature under any specific set of conditions will be apparent to those skilled in the art.

The present invention is applicable generally to polymerizable organic compounds, among which may be mentioned the following:

Methyl methacrylate
Ethyl methacrylate
Butyl methacrylate
Isobutyl methacrylate
Secondary butyl methacrylate
Tertiary amyl methacrylate
Phenyl methacrylate
Glycol monomethacrylate
Cyclohexyl methacrylate
P a r a - cyclohexylphenyl methacrylate
Decahydro - beta - naphthol methacrylate
Di-isopropyl carbinol methacrylate
Furfuryl methacrylate
Ethyl methylene malonate
Methallyl methacrylate
Tetrahydrofurfuryl methacrylate
Methacrylonitrile
Styrene
Alpha methyl styrene
Vinyl acetate
Vinyl acetate-vinyl chloride
Vinyl butyrate
Vinyl chlorobenzene
Vinyl naphthalene
Vinyl ethinyl carbinol
Methyl vinyl ketone
Dimethyl itaconate The above compounds may be used either alone or in admixture with each other.

While, per se, the following polymerizable organic compounds are not particularly well adapted for use in the present process, when mixed with methyl methacrylate or others of the compounds above, they give interpolymers which may be highly useful: glycol dimethacrylate, divinyl benzene, and methacrylic acid.

Vinyl chloride, a gas under atmospheric conditions, gives a polymer having useful properties as a turnery resin. This compound is a liquid under pressures of 50 pounds per square inch or so and may be used in the present process where conditions permit convenient handling of a compound of this nature.

The primary purpose of the present invention is the manufacture of turnery resins and the invention will not ordinarily be applied to the polymerization of compounds giving softer resins not generally suitable for turnery purposes. However, the invention is applicable to these softer resins also and, in some instances, it may be desirable to polymerize these resins in elongated shapes. Among the polymerizable organic compounds giving resins of this softer type may be mentioned:

Methyl acrylate
Ethyl acrylate
Butyl acrylate
Diethyl fumarate
Diethyl maleate
Divinyl ether.

Coloring matter, either soluble or insoluble, plasticizers, and various modifiers, and the like, may be mixed in the liquids to be polymerized. Polymerization catalysts such as benzoyl peroxide may be used. The selection and use of these various agents will be apparent to those skilled in the art. If a polymer is to be used for turnery purposes, it may be necessary or desirable to omit plasticizers. The process may be carried out in the absence of polymerization catalysts but preferably such catalysts are used.

Although the invention has been described specifically as applied to making cylindrical rods, it is equally applicable to the formation of elongated bodies in shapes of other cross sections, including sheets whose thickness corresponding to one of the horizontal dimensions of the mold used, is small in proportion to the length of the sheet which corresponds to the vertical dimension of the mold.

The present invention is thus applicable for manufacturing in substantially finished form such articles as handles for mirrors, brushes, and the like, and blanks, slugs, blocks, and sheets adapted to be finished by various machining operations.

One advantage of the present invention is that it provides a simple and economical means of producing flawless turnery shapes from polymerizable organic compounds which heretofore have entered this field in only limited amounts because of the difficulty resulting from the large shrinkage accompanying their polymerization. A further advantage of the invention is that it can be carried out readily with simple and inexpensive apparatus and, with the control of the temperature involved in the process, can be put upon an automatic basis.

As many apparently widely different embodiments of this invention may be made without departing from the spirit and scope thereof, it is to be understood that the invention is not limited to the specific embodiments thereof except as defined in the appended claims.

We claim:

1. Process of polymerizing a liquid composition comprising a monomeric polymerizable organic compound, in elongated shapes, which comprises introducing into a substantially vertically positioned elongated mold closed at the lower end a plurality of successive portions of the said liquid composition having successively lower viscosities, the difference in viscosity between successive portions being sufficient to prevent any substantial commingling thereof, and subjecting said composition to heat and simultaneously to pressure until said composition is polymerized to a solid body, the heat to which any of said portions of said liquid composition is subjected, not exceeding the heat to which any lower disposed portion of said liquid composition is subjected.

2. Process of polymerizing a liquid composition comprising a monomeric polymerizable organic compound, in elongated shapes, which comprises introducing into a substantially vertically positioned elongated mold closed at the lower end a plurality of successive portions of the said liquid composition, the portions being successively less far advanced in polymerization and the difference in degree of polymerization between successive portions being sufficient to give a difference in viscosity enough to prevent any substantial commingling thereof, and subjecting said composition to heat and simultaneously to pressure until said composition is polymerized to a solid body, the heat to which any of said portions of said liquid composition is subjected, not exceeding the heat to which any lower disposed portion of said liquid composition is subjected.

3. Process of polymerizing a liquid composition comprising a monomeric polymerizable organic compound, in elongated shapes, which comprises introducing into a substantially vertically positioned elongated mold closed at the lower end a plurality of successive portions of the said liquid composition having successively lower viscosities, the difference in viscosity between successive portions being sufficient to prevent any substantial commingling thereof, and subjecting said composition in the mold to an external source of heat maintained at a temperature substantially uniform throughout the height of said mold and simultaneously to pressure until said composition is polymerized to a solid body.

4. Process of polymerizing a liquid composition comprising a monomeric polymerizable organic compound, in elongated shapes, which comprises introducing into a substantially vertically positioned elongated mold closed at the lower end a plurality of successive portions of the said liquid composition having successively lower viscosities, the diffirence in viscosity between successive portions being sufficient to prevent any substantial commingling thereof, and applying heat from an external source to the bottom of the mold only and simultaneously subjecting said composition to pressure until said composition is polymerized to a solid body.

5. Process of polymerizing a liquid composition comprising monomeric methyl methacrylate, in elongated shapes, which comprises introducing into a substantially vertically positioned elongated mold closed at the lower end a plurality of successive portions of the said liquid composition having successively lower viscosities, the difference in viscosity between successive portions being sufficient to prevent any substantial commingling thereof, and subjecting said composition to heat and simultaneously to pressure until said composition is polymerized to a solid body, the heat to which any of said portions of said liquid composition is subjected, not exceeding the heat to which any lower disposed portion of said liquid composition is subjected.

6. Process of polymerizing a liquid composition comprising monomeric methyl methacrylate, in elongated shapes, which comprises introducing into a substantially vertically positioned elongated mold closed at the lower end a plurality of successive portions of the said liquid composition, the portions being successively less far advanced in polymerization and the difference in degree of polymerization between successive portions being sufficient to give a difference in viscosity enough to prevent any substantial commingling thereof, and subjecting said composition to heat and simultaneously to pressure until said composition is polymerized to a solid body, the heat to which any of said portions of said liquid composition is subjected, not exceeding the heat to which any lower disposed portion of said liquid composition is subjected.

7. Process of polymerizing a liquid composition comprising monomeric methyl methacrylate, in elongated shapes, which comprises introducing into a substantially vertically positioned elongated mold closed at the lower end a plurality of successive portions of the said liquid composition having successively lower viscosities, the difference in viscosity between successive portions being sufficient to prevent any substantial commingling thereof, and subjecting said composition in the mold to an external source of heat maintained at a temperature substantially uniform throughout the height of said mold and simultaneously to pressure until said composition is polymerized to a solid body.

8. Process of polymerizing a liquid composition comprising monomeric methyl methacrylate, in elongated shapes, which comprises introducing into a substantially vertically positioned elongated mold closed at the lower end a plurality of successive portions of the said liquid composition having successively lower viscosities, the difference in viscosity between successive portions being sufficient to prevent any substantial commingling thereof, and applying heat from an external source to the bottom of the mold only and simultaneously subjecting said composition to pressure until said composition is polymerized to a solid body.

9. Process of polymerizing a liquid composition comprising monomeric methyl methacrylate, in elongated shapes, which comprises introducing into a substantially vertically positioned elongated mold closed at the lower end a plurality, but not exceeding five, of successive portions of said liquid composition, each portion forming a layer in the mold not exceeding 2" in height and the portions having successively lower viscosities, the difference in viscosity between successive portions being sufficient to prevent any substantial commingling thereof, and subjecting said composition to heat and simultaneously to a pressure of 150–200 pounds per square inch until said composition is polymerized to a solid body, the heat to which any of said portions of said liquid composition is subjected, not exceeding the heat to which any lower disposed portion of said liquid composition is subjected.

CHARLES M. FIELDS.
REUBEN T. FIELDS.